Patented Jan. 16, 1940

2,187,144

UNITED STATES PATENT OFFICE

2,187,144

PREPARATION OF ORGANIC SULPHONATES

Adam Carr Bell, Gilbert De Wayne Miles, and Kenneth Lyman Russell, New York, N. Y., assignors to Colgate-Palmolive-Peet Company, Jersey City, N. J., a corporation of Delaware No Drawing. Application September 17, 1938, Serial No. 230,384

17 Claims. (Cl. 260—400)

This invention relates to a novel method of preparing salts of organic sulphonic acids and more particularly to a new process for preparing a salt from a different salt of sulphonic acids by the exchange of a cation for the cation of the sulphonate.

The term "sulphonation product" is used herein in its generally accepted broad meaning which includes the reaction of a "sulphonating" agent with any organic reactant by which a true sulphonic acid or a sulphuric acid ester is formed; and the term "sulphonate" is employed for the sake of brevity to designate neutralized sulphonic acids or sulphuric acid esters of organic compounds. In all cases, except in the examples or where otherwise stated, phosphoric acids may be used instead of sulphonating agents, resulting, of course, in the production of phosphates instead of sulphonates.

During recent years unusual activity in research has been directed toward the preparation of new deterging, foaming, dispersing, wetting, washing, emulsifying and the like agents, and numerous compounds resulting from the action of sulphuric acid, oleum, chlorosulphonic acid and other "sulphonating" agents, and phosphoric acids upon organic substances of many different types, and many processes for the production of these compounds have been described and patented. In the manufacture of such detergents, etc., it is necessary or economically advantageous to employ a large excess of the inorganic acid. Consequently, in the neutralization of the acidic mixture a correspondingly large quantity of base is required, and if a manufacturer wishes to produce a detergent salt of an expensive organic or inorganic base, much of the increase in cost of the base is wasted because of the excess sulphuric acid which must be neutralized with the organic sulphonic acid.

One method of making a salt of a sulphonic acid, or sulphonate, is by treating a sulphonate with a salt having the desired cation, the anion of which when combined with the cation of the sulphonate gives an insoluble inorganic salt. An example is the preparation of an ammonium sulphonate from a calcium sulphonate by treating the latter with ammonium sulphate. The calcium sulphate formed is insoluble and may be filtered off. This procedure involves steps which are not apparent at the first glance. When the sulphonic acid-inorganic acid mixture is neutralized with the calcium base (calcium hydroxide), the resultant mixture cannot be filtered with sufficient facility for commercial production without first diluting, because the presence of huge amounts of precipitate makes the mass very thick. After the insoluble calcium sulphate is filtered off, the calcium sulphonate solution is treated with ammonium sulphate or phosphate which reacts with the calcium sulphonate to form the ammonium sulphonate and calcium sulphate or calcium phosphate, the latter again being removed by filtration. Thereafter the ammonium sulphonate solution is concentrated to the desired degree. All these steps necessitate additional apparatus, space, chemicals, power, scientifically trained supervision, etc., which, together with unavoidable losses in handling, affect the cost of producing the final product.

Furthermore, so far as applicants are aware, no method has heretofore been known and described by which one salt of a sulphonation product may be converted to a different salt, that is, one cation changed to another cation with sufficient success to warrant commercial adaptation without producing an insoluble or volatile compound as a by-product. Previous methods by which potassium or ammonium sulphonates of sulphonation products were prepared involved the intermediate step of making a calcium sulphonate and the additional step of treating the calcium sulphonate in solution with a potassium or ammonium salt, the anion of which formed an insoluble salt with the calcium ion. This method permits neutralizing the sulphonation product with the less costly calcium base.

Therefore, in making ammonium or potassium sulphonates, for example, it has been necessary heretofore to follow the procedure outlined above or employ the more costly ammonium or potassium base in neutralizing the acidic sulphonation product and the excess sulphuric acid, thereby increasing the cost of producing the sulphonate of these cations.

Having in mind the defects of the prior art processes, it is an object of this invention to provide a new method of preparing sulphonates that is simpler of operation than those heretofore known, requires far less equipment and supervision, represents a marked economy, and is more efficient than the prior art processes. It is another object of this invention to provide a process whereby a sulphonate formed by a sulphonic acid and an inexpensive base can be transformed into the sulphonate in which the cation is representative of a more expensive base with a minimum of the more costly base. It is also an object of this invention to provide a process by which the cation of a sulphonate may be rapidly and easily replaced by a different cation. It is still a further object of this invention to provide a method for preparing such salts of sulphonation products as the ammonium, potassium, and amine salts directly from the sodium sulphonate. Other objects will become apparent with an understanding of the process as hereinafter disclosed.

Applicants have discovered that when a sulphonate dissolved in a solution comprising water and alcohol, or certain other organic solvents, is treated, as by agitation, with a concentrated solution of a salt, the cation of the salt replaces the cation of the sulphonate and the aqueous solution of the salt formed by the cation of the original sulphonate and the anion of the original salt will separate as a distinct layer, usually a lower layer; and the aqueous-organic solvent solution, usually the upper layer, contains a sulphonate having as its cation the cation of the original salt employed.

To briefly illustrate, if an aqueous-alcoholic solution of sodium lauryl sulphonate is thoroughly mixed with a concentrated aqueous solution of ammonium sulphate, two distinct layers or phases will form. The top layer will comprise water, alcohol and ammonium lauryl sulphonate, and the lower layer will comprise an aqueous solution of sodium sulphate and the excess ammonium sulphate. A very small amount of the sulphonate in the water-alcohol phase may remain as sodium sulphonate, but this may be substantially eliminated by subsequent treatments with concentrated solutions of ammonium sulphate. The ammonium sulphonate-water-alcohol solution layer may be separated from the salt solution layer, the alcohol driven off, and the remaining solution concentrated or diluted as desired.

In carrying out this process, both the sulphonate to be converted and the desired sulphonate should be soluble in the water-organic solvent mixture selected. Applicants have found that mineral oil sulphonates, fatty alcohol sulphates, fatty acid monoglyceride sulphonates and sulphates, aromatic sulphonates, and others appear to be admirably adapted to this process; in fact, on the basis of many actual tests, it is believed that all organic sulphonates, sulphates and phosphates may be changed by the method herein described.

The following organic solvents and mixtures thereof have been found suitable for use in this process, although the list is not to be considered exhaustive: ethanol, propanol, isopropanol, n-butanol, tertiary butanol, n-hexanol, acetone, dioxane, Cellosolve (ethylene glycol monoethyl ether), Carbitol (diethylene glycol monoethyl ether) and monoglyceride (of coconut oil acids). It should be noted that the organic solvents which function in this process are not all miscible with water alone, for example, n-hexanol. Water-immiscible solvents, however, may become sufficiently miscible, if not completely soluble, in the aqueous sulphonate solution for the purpose of this invention.

Salts which are suitable for use in this invention should be soluble to some degree in the water-organic solvent mixture selected but preferably less soluble than in water alone, and the anion of the salt employed should be of a class which will form water-soluble salts with the cation of the original sulphonate.

The concentrations of the various compounds in the solutions have an important bearing on the successful operation of the process according to this invention, although they may vary with the particular organic solvent employed, the sulphonate, and the salt utilized as well as the salt produced. The amount of water in the water-organic solvent mixture should be sufficient so that the mixture will dissolve the sulphonate.

In order to effect a separation of the water-organic solvent solution of the sulphonate containing the new cation from the aqueous solution of salt mixture resulting from the procedure, at least a certain quantity of the organic solvent or solvents must be present, i. e., enough to cause the formation of layers. To illustrate this formation of layers, the table below is given. The first column represents a water solution of a mixture of the sodium salt of sulphated monoglycerides of coconut oil fatty acids and sodium sulphate in which the proportion of the former to the latter is 35:65. In other words, in 100 grams of the solution, a certain percentage (or number of grams) is solids comprising 35% organic sulphate and 65% sodium sulphate. The values given under the headings of the organic solvents are the percentages of those solvents, based on the total solids in the aqueous solutions employed, which when added to the aqueous solutions will just cause a separation of the liquid mass into layers at 100° F. It is advisable to use a greater quantity of organic solvent, however, in order to get quicker and more complete separation.

| Aqueous solution percent solids | Ethanol (95%) | Isopropanol (98%) | Butanol | Acetone | Cellosolve | Dioxane |
|---|---|---|---|---|---|---|
| 40 | 17 | 8.5 | 13 | 15 | 9.3 | 7.8 |
| 35 | 23 | 15 | 15 | 20 | 21 | 19.5 |
| 30 | 48 | 20 | 18 | 42 | 38 | 34 |
| 25 | 90 | 25 | 20 | 70 | 65 | 63 |
| 20 | 142 | 75 | 26 | 114 | 128 | 122 |
| 15 |  | 164 | 36 | 206 | 280 | 252 |

The temperature at which these values were determined was about 100° F. In order that the table may be readily understandable, an explanation of the first value of the table is given. One hundred grams of the water solution taken contained 40% solids, or 40 grams, of which 35% or 14 grams was organic sulphate, while 65%, or 26 grams, was sodium sulphate. To this solution it was necessary, at the temperature stated, to add ethanol to the extent of 17% (of the solids), or 6.8 grams, to cause a separation.

An aqueous solution containing substantially above 40% solids of the particular mixture in the proportions as in this case cannot be so satisfactorily prepared and employed in the process, and no separation at all was obtained by the use of ethanol in a 15% solution of this mixture at the temperature specified. While the quantities given are for a particular organic sulphate mixed with a particular inorganic sulphate, it is to be understood that for other salts, organic compounds, and temperatures different quantities of solvents may be required. The most desirable range of concentration of solids in the solutions of this sulphonate and sulphate lies between about 15% as a minimum and about 40% as a maximum although this process is not limited thereto and does not exclude concentrations of more or less solids in proper conditions.

Removal of the greatest amount of salts used, and formed as a by-product of the process, requires more organic solvent than that which will just cause separation.

Salts of any inorganic or amine cation may be employed to convert the sulphonate if the conditions of solubilities are met. The following list shows the final sulphonates obtained and the salt used for the conversion in a number of tests. In each case the starting sulphonate was the sodium salt of the sulphuric acid ester of monoglyceride (of coconut oil fatty acids).

| Converted to the sulphonate of— | By means of— |
|---|---|
| Amonium | Ammonium sulphate. |
| Do | Ammonium phosphate. |
| Monoethanolamine | The amine sulphate. |
| Do | The amine phosphate. |
| Triethanolamine | The sulphate of triethanolamine. |
| Magnesium | The sulphate of magnesium. |
| Zinc | Zinc sulphate. |
| Iron (ferrous) | Ferrous sulphate. |

The examples hereinafter given are illustrative only and are in no sense limitative:

Example I

One hundred and twenty grams of a substantially dry mixture of sodium sulphate and the sodium sulphate of monoglycerides of coconut oil fatty acids (ratio 65:35) were dissolved in 225 grams of water, with stirring, at 104° F. With this solution 36 grams of ethyl alcohol (95%) were mixed. Two layers formed, the top layer containing the organic sulphate and the lower layer sodium sulphate. The layers having been separated, 45 grams of ammonium sulphate solution (containing 18.5 of dry salt) were added to the water-alcohol solution of the organic sulphate (the top layer), with thorough mixing. The lower layer was drawn off and the new upper layer found to have been about 60% converted to the ammonium salt. The procedure was repeated, using the upper layer with substantially the same amount of ammonium sulphate solution. This gave about 90% conversion.

The treatment with ethanol of the mixture of organic salt and sodium sulphate employed at the beginning of the example is illustrative of the purification of the sulphonate prepared in a commercial process followed by conversion to the desired salt by the process of this invention.

Example II

A solution containing 42 grams of sodium salt of sulphuric ester of monoglyceride (of coconut oil fatty acids) in 48 grams of water and 36 grams (45 c. c.) isopropyl alcohol was mixed with 70 grams of a saturated solution of ferrous sulphate. The solutions separated rapidly into two layers; the top layer assuming a dark color, thus indicating the presence of ions of iron. The temperature throughout was about 104° F.

Example III

Forty grams of the same organic sulphate employed in Example II were dissolved in a mixture of 45 grams of water and 36 grams of acetone. With this solution were mixed 30 grams of a 50% magnesium sulphate solution, and the lower layer which formed (containing sodium and magnesium sulphates) was drawn off and discarded. In like manner, the water-acetone solution of organic sulphate was treated successively with two more 30 gram portions of magnesium sulphate solution. The acetone was driven off and the magnesium salt of the organic sulphate dried. The temperature during this process was maintained at around 100° F.

Example IV

A solution of 50 grams of the sodium salt of sulphated aliphatic alcohols (corresponding to coconut oil fatty acids) in 100 grams of water and 40 grams of ethanol was thoroughly mixed with 40 grams of a saturated aqueous solution of ammonium sulphate, the aqueous-alcohol solution of the organic sulphate drawn off and mixed with a second 40 grams of a saturated aqueous solution of ammonium sulphate. (The temperature was kept at about 120° F.) The clear upper layer was almost completely converted to the ammonium salt of the sulphated aliphatic alcohols.

Example V

A solution containing 50 grams of the sodium salt of a sulphonated liquid sulphur dioxide extract of Pennsylvania crude mineral oil, sulphonated in liquid sulphur dioxide (as described in co-pending application of Robert L. Brandt, Serial No. 211,946, filed June 4, 1938), 120 grams of water and 48 grams of ethyl alcohol were mixed thoroughly with a 40 gram portion of a 41% aqueous ammonium sulphate solution, the temperature being about 115° F. throughout. Separation of the mixture into two layers was rapid and clearly defined. The water-alcohol layer containing the sulphonate was treated with a second portion (of 40 grams) of the 41% aqueous ammonium sulphate solution. After the lower layer was drawn off, the remaining water-alcohol solution of the mineral oil sulphonate was found to have been almost completely converted to its ammonium salt.

While we have disclosed the employment of sulphonates of particular cations with salts of other particular cations, we may also employ mixed salts having the same or different anions, but different cations, and thus obtain mixed sulphonates with desirable proportions of various cations. We may also employ mixed sulphonates.

In many instances it will be advantageous to utilize the final sulphonate without driving off or otherwise separating the water-organic solvent mixture. For example, when the final detergent is to be employed in a shampoo, it may be advantageous to retain some of the ethyl alcohol or monoglyceride. Other instances when the solvent mixture with the detergent will be desirable in a particular use will be recognized by those skilled in the art of compounding emulsions, cosmetics, shaving creams, shampoos, germicidal preparations, insecticides, etc.

The use of the particular organic sulphonates in the examples is not to be taken as limiting the process thereto, but rather illustrative of the universality of application of this invention. We may change the order of mixing or dissolving the materials employed within the spirit of the invention.

We claim:
1. A process of converting organic sulphonates of a particular cation to sulphonates of a different cation which comprises dissolving the sulphonates to be converted in a mixture of water and an organic solvent, treating the solution with a concentrated aqueous solution of a salt containing the different cation, separating the liquid phases so formed, and recovering the converted sulphonate from the aqueous-organic solvent phase, said mixture of water and organic solvent having the properties of dissolving both the original and the converted sulphonate and causing the formation of immiscible liquid phases.

2. The process of claim 1 in which a mixture of sulphonates containing at least one type of cation is converted to a mixture containing substantially predetermined proportions of sulphonates of desired cations by the use of a mixture of salts containing the required proportions of cations and one or many anions.

3. A process of converting a salt of an organic sulphonic acid to a different salt which comprises treating a solution of the sulphonate in a solvent mixture comprising water and an organic solvent selected from the group consisting of ethanol, propanol, isopropanol, n-butanol, tertiary butanol, n-haxanol, acetone, dioxane, ethylene glycol monoethyl ether, diethylene glycol monoethyl either, and monoglycerides of higher fatty acids, with a solution of a salt having the desired cation and separating the sulphonate solution layer.

4. The process of claim 3 in which the sulphonate is a salt of the sulphate of monoglycerides of fatty acids.

5. The process of claim 3 in which the converting salt is ammonium sulphate.

6. The process of claim 3 in which the converting salt is an organic amine salt.

7. The process of claim 3 in which the sulphonate is a salt of a sulphated fatty alcohol having at least 8 carbon atoms in the chain.

8. The process of claim 3 in which the sulphonate is a salt of a sulphonated mineral oil.

9. The process of claim 3 in which the sulphonate is the salt of a sulphonated aromatic organic compound.

10. The process of claim 3 in which the solvent employed is water and a mixture of at least two of the organic solvents.

11. A process of converting salts of organic sulphonic acids to mixtures of sulphonates containing different cations which comprises treating a solution of the sulphonates in a solvent mixture comprising water and an organic solvent selected from the group consisting of ethanol, proponal, isopropanol, n-butanol, tertiary butanol, n-hexanol, acetone, dioxane, ethylene glycol monoethyl ether, diethylene glycol monoethyl ether, and monoglycerides of higher fatty acids with a solution of salts having desired cations, the proportions of the salts being substantially that desired in the final sulphonates, and separating the sulphonate solution layer from the aqueous solution layer.

12. A process of converting organic sulphonates of a particular cation to sulphonates of a different cation which comprises dissolving the sulphonates to be converted in a mixture of water and a plurality of organic solvents, treating the solution with a concentrated aqueous solution of a salt containing the different cation, separating the liquid phases so formed, and recovering the converted sulphonate from the aqueous-organic solvent phase, said mixture of water and organic solvents having the properties of dissolving both the original and the converted sulphonate and causing the formation of immiscible liquid phases.

13. A process of converting the sodium salt of the sulphate of monoglycerides of coconut oil fatty acids to the ammonium salt thereof which comprises mixing a water-ethanol solution of the organic sulphate with a concentrated solution of ammonium sulphate and separating the aqueous solutions of sodium and ammonium sulphate which separates.

14. A process of making a substantially pure salt of an acid selected from the group consisting of sulphonic, organic sulphuric and organic phosphoric acids, having admixed therewith the corresponding inorganic acid, which comprises neutralizing the acid mixture with an inorganic basic substance, adding water and at least one organic solvent, separating the liquid layer which contains the organic salt, mixing therewith a concentrated solution of a salt which contains a cation desired in the final organic salt, and separating the organic solvent layer containing the desired organic salt.

15. The process of claim 14 followed by the step of recovering the organic salt from the liquid layer.

16. A process of making a substantially pure salt of an acid selected from the group consisting of sulphonic, organic sulphuric and organic phosphoric acids, having admixed therewith the corresponding inorganic acid, which comprises neutralizing the acid mixture with a basic substance, adding sufficient water and organic solvent to cause the formation of liquid layers, separating the layer containing the organic salt, mixing therewith a concentrated solution of a salt containing a cation desired in the final organic salt, and separating the organic solvent layer containing the desired organic salt.

17. The process of preparing substantially pure salts of organic derivatives of polybasic, oxygen-containing, mineral acids which comprises neutralizing an acid mixture of an organic derivative of a polybasic, oxygen-containing, mineral acid and a polybasic, oxygen-containing, mineral acid, adding water and an organic solvent for the salt of the organic derivative so as to form an aqueous phase containing the salt of the inorganic acid and an organic-solvent phase containing both the salt of the organic derivative and some water, separating the two phases, and treating the organic solvent phase with an excess of an aqueous solution of a salt of an inorganic acid of a second cation different from that of the salt of the organic derivative whereby a salt interchange takes place to yield an organic solvent solution of a substantially pure salt of the organic derivative of the second cation.

ADAM CARR BELL.
GILBERT DE WAYNE MILES.
KENNETH LYMAN RUSSELL.

CERTIFICATE OF CORRECTION.

Patent No. 2,187,144.  January 16, 1940.

ADAM CARR BELL, ET AL.

It is hereby certified that error appears in the printed specification of the above numbered patent requiring correction as follows: Page 4, first column, line 14, claim 3, for "n-haxanol" read n-hexanol; line 16, same claim, for "either" read ether; line 44, claim 11, for "proponal" read propanol; and that the said Letters Patent should be read with this correction therein that the same may conform to the record of the case in the Patent Office.

Signed and sealed this 12th day of March, A. D. 1940.

(Seal)
Henry Van Arsdale,
Acting Commissioner of Patents.